United States Patent [19]

Pfleger et al.

[11] Patent Number: 5,376,740
[45] Date of Patent: Dec. 27, 1994

[54] PREPARATION OF COPOLYMERS OF ETHYLENE WITH ACRYLATES OR ACRYLIC ACID

[75] Inventors: Klaus Pfleger, Wesseling; Siegfried Schiller, Bruehl; Gerhard Arnold, Wesseling, all of Germany

[73] Assignee: BASF Aktiengesellschaft, Ludwigshafen, Germany

[21] Appl. No.: 77,363

[22] Filed: Jun. 17, 1993

[30] Foreign Application Priority Data

Jun. 19, 1992 [DE] Germany .................. 4219983

[51] Int. Cl.⁵ .................. C08F 2/34; C08F 220/06
[52] U.S. Cl. .................. 526/64; 526/66; 526/87; 526/318.6
[58] Field of Search .................. 526/64, 66, 87, 318.6

[56] References Cited

U.S. PATENT DOCUMENTS 4,788,265 11/1988 Pfleger et al. .................. 526/64

Primary Examiner—Joseph L. Schofer
Assistant Examiner—Tom Weber
Attorney, Agent, or Firm—Keil & Weinkauf

[57] ABSTRACT

Copolymers of ethylene with acrylates or acrylic acid are prepared by copolymerizing 100 parts by weight of ethylene with from 1.0 to 20.0 parts by weight of tert-butyl acrylate or tert-butyl methacrylate or acrylic acid or solutions of acrylic acid in acrylates in a continuously operated, tubular polymerization system at above 800 bar and at from 130° to 320° C. in the presence of a free radical polymerization initiator by feeding two gas streams into the polymerization system, by a process in which the first gas stream contains exclusively ethylene with a polymerization initiator and, if required, a polymerization regulator and the second gas stream contains a mixture of ethylene and tert-butyl acrylate or tert-butyl methacrylate or a mixture of ethylene with a solution of acrylic acid in acrylates and polymerization initiators and, if required, polymerization regulators.

3 Claims, No Drawings

PREPARATION OF COPOLYMERS OF ETHYLENE WITH ACRYLATES OR ACRYLIC ACID

The present invention relates to a process for the preparation of copolymers of ethylene with acrylates or acrylic acid by copolymerization of 100 parts by weight of ethylene wit5 from 1.0 to 20.0 parts by weight of tert-butyl acrylate or tert-butyl methacrylate or acrylic acid or solutions of acrylic acid in acrylates in a continuously operated, tubular polymerization system at above 800 bar and at from 130° to 320° C. in the presence of a free radical polymerization initiator by feeding two gas streams into the polymerization system.

The copolymers obtained by the novel process are used in particular as hotmelt adhesives, for example for metals, ceramics, paper, textiles, plastics, wood, glass, etc.; owing to their properties, they are employed, for example for coating metal pipes or foils, for example in the production of plastics-coated pipes for pipelines or very thin metal layers, for example aluminum foils, which, after coating, are used as foil tapes for insulating electric cables.

The copolymers obtained are also used as adhesion promoters in the production of composite materials. Furthermore, the direct adhesive bonding of metals to metals with the aid of these copolymers is possible, for example production of sandwich panels having a polyethylene core.

In all applications, high adhesive strength of the products is required.

Information about ethylene for high pressure polymerization processes in which tubular reactors are used is to be found in, for example, Ullmanns Encyklopädie der technischen Chemie, 4th Edition, Volume 19, pages 167 to 178.

Ethylene/acrylic acid copolymers or ethylene/acrylate copolymers are the ethylene copolymers which can be prepared under the stated temperature and pressure conditions, preferably at from 1,500 to 3,000 bar and from 120° to 320° C.

The copolymers obtained contain from 0.5 to 25% by weight, preferably from 2.0 to 20.0%, by weight of polymerized comonomers. The melt flow index of the products is from 0.1 to 30 g/10 min, determined according to ASTM-D 1238-65T at 190° C. and with an applied weight of 2.16 kg. The density of the copolymers is from 0.9240 to 0.9360 g/cm$^3$, measured according to DIN 53,479.

It is known that the ethylene stream can be divided into a plurality of part streams in the high pressure polymerization of ethylene. Processes described in British Patent 1,010,847, 915,210 and 1,347,361 and U.S. Pat. No. 3,725,378 aim at increasing the conversion of the ethylene to polyethylene per throughput. The preparation of copolymers of ethylene with acrylic acid or acrylates is likewise known and is described in the patent literature. For example, in French Patent 1,596,991, in the preparation of copolymers of ethylene with acrylates the temperature in the reactor is chosen to be so high that some or all of the secondary and tertiary ester groups in the polymer are pyrolyzed, free carboxyl groups being obtained in the copolymer with elimination of an alkene.

The known processes all have the disadvantage that they give products whose mechanical strength and especially adhesive strength do not meet the requirements in practice. Under the reaction conditions of the known process, a certain proportion of low molecular weight products, especially low molecular polyacrylates, are formed and have adverse effects on the mechanical properties of the copolymers.

German Patent 3,615,562 describes a process in which a mixture of ethylene and acrylates is fed to the reactor in the main stream and in a plurality of side streams and is reacted. In this process, the formation of low molecular weight products is greatly reduced but not completed prevented. The adhesive strengths of the products obtained by this process likewise require improvements.

It is an object of the present invention to provide a process for the preparation of copolymers of ethylene with tert-butyl acrylate or tert-butyl methacrylate or acrylic acid or solutions of acrylic acid in acrylates in a tubular polymerization system, in which in particular the mechanical strengths, such as adhesive strength, of the copolymers are improved while maintaining the good general polymerization properties and the good conversion.

We have found that this object is achieved according to the invention, if the first gas stream contains exclusively ethylene with a polymerization initiator and, if required, a polymerization regulator and the second gas stream contains a mixture of ethylene and tert-butyl acrylate or tert-butyl methacrylate or a mixture of ethylene with a solution of acrylic acid in acrylates and polymerization initiators and, if required, a polymerization regulator.

A preferred ratio of the two gas streams is from 3:7 to 6:4, preferably 1:1.

The mixing temperature after the two gas streams meet should be kept above 195° C., preferably at from 210° to 230° C.

The process can be carried out using the conventional continuously operated, tubular polymerization systems (tubular reactors). Tubular reactors are tubular polymerization systems in which the ratio of length to diameter of the pressure-resistant tubes is from 10,000:1 to 60,000:1.

In the novel process, two-zone reactors are used; such a reactor is a tubular polymerization system to which two gas streams are fed in such a way that the reaction mixture is passed to the first reaction zone by the first gas stream, and the second gas stream is combined, roughly in the middle of the reactor, with the mixture leaving the first reaction zone; the reaction mixture resulting after mixing is then fed into the second reaction zone and is reacted there.

In addition to acrylic acid, solutions of acrylic acid in acrylates are also used in the copolymerization of ethylene. The acrylic acid solutions contain preferably up to 50, in particular up to 30%, by weight of acrylic acid. The acrylates used are esters of acrylic or methacrylic acid with $C_1$-$C_8$-alkanols, preferably $C_1$-$C_6$-alkanols; a solution of acrylic acid and methyl acrylate or n-butyl acrylate is particularly preferred.

If acrylates are used alone in the copolymerization of ethylene, tert-butyl acrylate and tert-butyl methacrylate are preferred.

The ethylene is copolymerized with acrylic acid or with solutions of acrylic acid in acrylates or with tert-butyl acrylate or with tert-butyl methacrylate in the presence of a free radical polymerization initiator. Free radical polymerization initiators should be understood as being the catalysts which are also used in the homopolymerization of ethylene under high pressure. For example, oxygen is suitable, advantageously in amounts of from 2 to 100 mol ppm, based on the ethylene to be polymerized. Peroxides, hydroperoxides and other free radical formers, as well as mixtures of peroxides and mixtures of oxygen and peroxides, are also suitable. Examples of peroxides and hydroperoxides are tert-butyl peroxypivalate, di-tert-butyl peroxide, tert-butyl hydroperoxide, tert-butyl perbenzoate, p-menthane hydroperoxide and dilauroyl peroxide. Free radical polymerization initiators are also to be understood as compounds such as azobisisobutyronitrile. Mixtures of oxygen and one or more peroxides may also be used.

The copolymerization of ethylene with acrylic acid or solutions of acrylic acid in acrylate or tert-butyl acrylate or tert-butyl methacrylate is preferably initiated by oxygen or tert-butyl peroxypivalate.

The reaction is usually carried out in the presence of polymerization regulators. With the aid of polymerization regulators, it is possible to adjust the melt flow index of the copolymers formed. Hydrogen, ketones, aldehydes, alcohols, ethers and normal and branched hydrocarbons are used as regulators. Propylene, propane or propionaldehyde is preferably used. The polymerization regulators are used in general in amounts of from 0.2 to 5 mol %, based on the ethylene to be polymerized.

In a particular embodiment of the novel process, when tert-butyl acrylate or tert-butyl methacrylate is used, elimination of isobutene is known to occur during the reaction; in these cases, it is possible to dispense with additional regulators since the isobutene formed has regulator properties. The copolymerization is carried out in general in the absence of solvents. The small amounts of inert solvent in which the peroxides are dissolved can be neglected compared with the other starting materials.

If oxygen is used as the polymerization initiator, all solvents can be dispensed with.

In the novel process, the polymerization of the ethylene to give a homopolymer is carried out in the first reaction zone of the two-zone reactor, which is fed via the first gas stream which contains exclusively ethylene and initiator and, if required, a regulator; the reaction mixture leaving the first reaction zone is then mixed with the second gas stream which, in addition to ethylene, also contains acrylic acid or a solution of acrylic acid in acrylates or tert-butyl acrylate or tert-butyl methacrylate. The resulting mixture is fed into the second reaction zone and copolymerized there.

It is of decisive importance for the reaction mixture to be at not less than 195° C., preferably from 210° to 230° C., on entering the second reaction zone. This means that the actual copolymerization is not effected until higher temperatures are reached.

Surprisingly, it has been found that, under these reaction conditions, a copolymer containing an extremely small amount of low molecular weight polyacrylate molecules is formed. At the higher temperatures which the reaction mixture passes through in the second reaction zone, the ethylene is activated to such an extent that it and the comonomers, which are more reactive owing to their chemical constitution, immediately take part in the copolymerization which begins.

The copolymer obtained by the novel process does not have a random distribution of the polymerized acrylic acid or acrylate building blocks in its molecular structure; instead, it is the copolymer which has relatively long sequences of a purely ethylenic structure, followed by blocks of polymerized comonomers in the higher molecular weight region.

Surprisingly, a copolymer having the structure described has considerable advantages with regard to the adhesive strength over the copolymers obtained by known processes.

The adhesion values stated in the Examples which follow were determined using composite test specimens, the property of the copolymers as an adhesion promoter in an aluminum/copolymer/aluminum composite being tested. The adhesion is determined as the force required to separate a 15 mm wide composite strip.

The test specimens are produced as follows: Two aluminum foils are washed with acetone on the high-gloss side, dried and arranged on a substrate in such a way that the surface structures of the two aluminum foils are parallel. 4 g of the copolymer are then placed in the middle of the right foil; it should be ensured that granule particles do not rest one on top of the other and the distances between the granule particles are as small as possible. A 0.2 mm thick paper strip (40×210 mm) is placed on the right aluminum foil, flush with the edge. The left aluminum foil is folded onto the right aluminum foil, the high-gloss side pointing downward and the surface structure being arranged parallel to the lower foil. The package formed is placed between the press sheets and introduced completely into the press preheated to 180° C. The pressing process is carried out over three minutes at 80 bar. After cooling, the packet is removed from the press. Using sheet scissors, notch-free strips having a width of 15±0.5 nun are cut parallel to the structuring of the aluminum surface.

The adhesion is determined with the aid of a tensile test apparatus according to DIN 51,221 with electronic measurement of force changes and length changes and with an electromechanical drive (Zwick GmbH & Co., D-7900 Ulm, Series 1400).

The composite test strips are opened up in the unbonded region and clamped in the tensile test apparatus. To determine the adhesion, the test strips are parted at a speed of 100 m/min. The resulting tensile forces are recorded on a force/time diagram. The mean value of 10 representative individual measurements is stated as the adhesion, in N/15 nun.

EXAMPLE

In a two-zone reactor, a mixture of 1,000 parts by weight of ethylene with 3.6 parts by weight of propylene as a polymerization regulator and 15 mol ppm, based on ethylene, of oxygen was passed into the first reaction zone with gas stream A and polymerized at 2,200 bar. The inlet temperature was 170° C. and the maximum temperature in the first reaction zone reached from 306° to 308° C.

With gas stream B, a mixture of 1,000 parts by weight of ethylene, 75 parts by weight of tert-butyl acrylate and 12 mol ppm, based on ethylene, of oxygen was added to the reaction mixture leaving the first reaction zone, at the mixing point of the reactor.

The mixing temperature at which the resulting mixture of the two gas streams was passed into the second reaction zone was 225° C.

In the second reaction zone, a maximum temperature of 296° C. was reached.

455 kg of a copolymer which had very good adhesive strengths were obtained.

Analyses gave the following values:

| Melt flow index | 6.8 ± 0.1 g/10 min |
| --- | --- |
| Density | 0.9278 g/cm$^3$ |
| Content of tert-butyl acrylate | 7.4 ± 0.1% by weight |
| Content of free acrylic acid | 4.15 ± 0.05% by weight |
| Adhesive strength (mean value of 10 individual measurements) | 88 N/15 mm, measured according to DIN 51,221 |

COMPARATIVE EXAMPLE

A mixture of 1,000 parts by weight of ethylene, 27 parts by weight of tert-butyl acrylate and 3.6 parts by weight of propylene and 12 mol ppm, based on ethylene, of oxygen was fed, in gas stream A, to the same two-zone reactor as in Example 1 and was reacted in the first reaction zone at 2,200 bar, a maximum temperature of 305° C. being reached.

With gas stream B, a mixture of 1,000 parts by weight of ethylene, 48 parts by weight of tert-butyl acrylate and 12 mol ppm, based on the ethylene, of oxygen was added to the reaction mixture leaving the first reaction zone at the mixing point of the reactor.

The mixing temperature at which the mixture was passed into the second reaction zone was 180° C.

In the second reaction zone, a maximum temperature of 300° C. was reached.

464 kg of copolymer were obtained, for which the following analytical values were determined:

| Melt flow index | 6.6 ± 0.1 g/10 min |
| --- | --- |
| Density | 0.9285 g/cm$^3$ |
| Content of tert-butyl acrylate | 7.2 ± 0.1% by weight |
| Content of free acrylic acid | 4.2 ± 0.1% by weight |
| Adhesive strength (mean value of 10 individual measurements) | 38.5 N/15 mm, measured according to DIN 51,221. |

We claim:

1. A process for the preparation of copolymers of ethylene with acrylates or acrylic acid by copolymerization of 100 parts by weight of ethylene with from 1.0 to 20.0 parts by weight of tert-butyl acrylate or tert-butyl methacrylate or acrylic acid or solutions of acrylic acid in acrylates in a continuously operated, tubular polymerization system at above 800 bar and at from 130° to 320° C. in the presence of a free radical polymerization initiator by feeding two gas streams into the polymerization system, wherein the first gas stream contains exclusively ethylene with a polymerization initiator and, if required, a polymerization regulator and the second gas stream contains a mixture of ethylene and tert-butyl acrylate or tert-butyl methacrylate or a mixture of ethylene with a solution of acrylic acid in acrylates and polymerization initiators and, if required, polymerization regulators.

2. A process as claimed in claim 1, wherein the ratio of the two gas streams is maintained at from 3:7 to 6:4, preferably 1:1.

3. A process as claimed in claim 1, wherein the mixing temperature after the meeting of the two gas streams is kept above 195° C., preferably at from 210° to 230° C.

* * * * *